(12) United States Patent
Shikata et al.

(10) Patent No.: US 7,831,987 B2
(45) Date of Patent: Nov. 9, 2010

(54) PROGRAM SELECTING METHOD

(75) Inventors: Yasushi Shikata, Kanagawa (JP); Kazuna Maruyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 989 days.

(21) Appl. No.: 10/984,810

(22) Filed: Nov. 10, 2004

(65) Prior Publication Data

US 2005/0114885 A1    May 26, 2005

(30) Foreign Application Priority Data

Nov. 21, 2003    (JP) .............................. 2003-392150

(51) Int. Cl.
*G06F 13/00* (2006.01)
*G06F 3/00* (2006.01)
*H04N 5/445* (2006.01)

(52) U.S. Cl. .......................... 725/41; 715/838; 725/38; 725/43; 725/46; 725/61; 725/86

(58) Field of Classification Search ................... 725/32, 725/40, 41, 42, 45, 46
See application file for complete search history.

(56) References Cited

U.S. PATENT DOCUMENTS

| | | | | |
|---|---|---|---|---|
| 5,161,019 A * | 11/1992 | Emanuel | ...................... | 725/56 |
| 5,635,989 A * | 6/1997 | Rothmuller | ................... | 725/46 |
| 5,737,029 A * | 4/1998 | Ohkura et al. | ................ | 725/56 |
| 5,841,433 A * | 11/1998 | Chaney | ........................ | 725/50 |
| 5,926,230 A * | 7/1999 | Niijima et al. | ................ | 725/56 |
| 6,115,080 A * | 9/2000 | Reitmeier | ................... | 348/731 |
| 6,154,203 A * | 11/2000 | Yuen et al. | .................... | 725/52 |
| 6,219,837 B1 | 4/2001 | Yeo et al. | | |
| 6,236,395 B1 * | 5/2001 | Sezan et al. | .................. | 715/723 |
| 6,349,329 B1 * | 2/2002 | Mackintosh et al. | ........ | 709/219 |
| 6,505,348 B1 * | 1/2003 | Knowles et al. | ............... | 725/49 |
| 6,611,958 B1 * | 8/2003 | Shintani et al. | ............... | 725/58 |
| 6,637,029 B1 * | 10/2003 | Maissel et al. | ................ | 725/46 |
| 6,756,997 B1 * | 6/2004 | Ward et al. | ................... | 715/716 |
| 6,918,132 B2 * | 7/2005 | Gargi | .......................... | 725/45 |
| 6,934,917 B2 * | 8/2005 | Lin | ............................. | 715/811 |
| 6,934,964 B1 * | 8/2005 | Schaffer et al. | ............... | 725/46 |
| 6,971,121 B2 * | 11/2005 | West et al. | ................... | 725/142 |
| 7,047,548 B2 * | 5/2006 | Bates et al. | ................... | 725/38 |
| 7,299,484 B2 * | 11/2007 | Thompson | ................... | 725/38 |
| 2002/0056098 A1 * | 5/2002 | White | ......................... | 725/39 |
| 2002/0140805 A1 * | 10/2002 | Gutta et al. | ................... | 348/40 |
| 2003/0014752 A1 * | 1/2003 | Zaslavsky et al. | ............ | 725/40 |
| 2003/0088870 A1 | 5/2003 | Wang | .......................... | 725/44 |
| 2004/0068741 A1 | 4/2004 | Kimura | | |

(Continued)

FOREIGN PATENT DOCUMENTS

CN    1416274    5/2003

(Continued)

*Primary Examiner*—Joseph P Hirl
*Assistant Examiner*—Brett Rustemeyer
(74) *Attorney, Agent, or Firm*—Fitzpatrick, Cella, Harper & Scinto

(57) ABSTRACT

A program selecting method includes the steps of: storing still pictures or motion pictures of specific scenes of a plurality of viewed programs selected in a predetermined period; presenting the pictures of the specific scenes corresponding to a plurality of programs viewed in the past, during operation of program selection; and selecting the viewed program corresponding to the picture selected by operation of selecting the pictures presented.

8 Claims, 12 Drawing Sheets

U.S. PATENT DOCUMENTS

2005/0097601 A1 * 5/2005 Danker et al. .................. 725/39

FOREIGN PATENT DOCUMENTS

| | | |
|---|---|---|
| CN | 1419782 | 5/2003 |
| JP | 9-139655 A | 5/1997 |
| JP | 11-220675 A | 8/1999 |
| JP | 2000253325 | 9/2000 |
| JP | 2000-333094 A | 11/2000 |
| JP | 2003 023589 | 1/2003 |
| WO | WO 97/34414 | 9/1997 |
| WO | WO 02/01862 | 1/2002 |

* cited by examiner

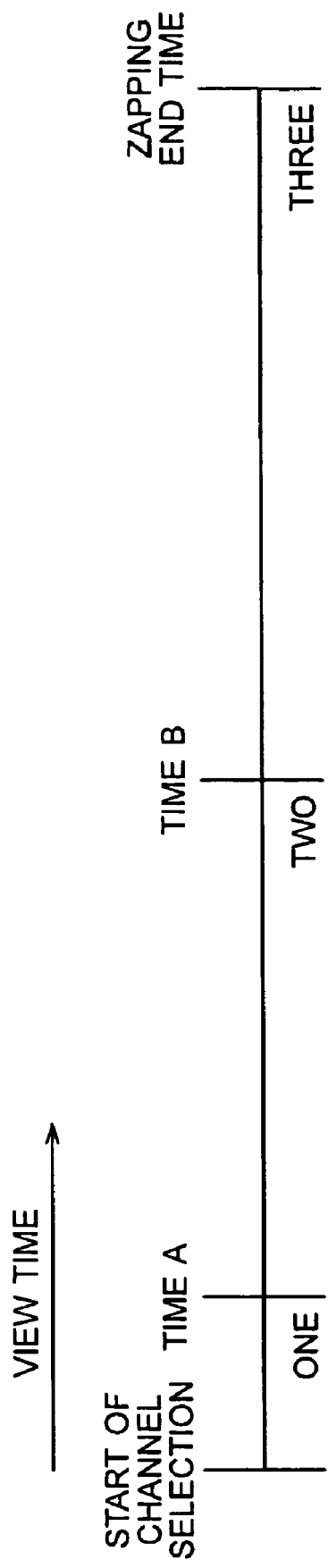

PROGRAM SELECTING METHOD

BACKGROUND OF THE INVENTION

1. Field of the Invention

The present invention relates to a program selecting method of selecting a program.

2. Description of the Related Art

When a viewer retrieves a desired television (TV) program from a group of TV programs which are presently being broadcasted, the most-familiar and frequently-used method is a method of selecting a channel by using an up/down key or ten keys of a remote controller to find a program while directly viewing programs. In the channel selection with the up/down key, the retrieval order is the order of channels. In the channel selection with the ten keys, a channel is assigned to each of the keys, so that the retrieval order is an order of selection of the ten keys by the viewer. The viewer finds a desired program by using any of the methods (hereinbelow, this operation will be called "zapping").

In recent years, because of digitalization of broadcasting, the number of viewable programs is increasing. For the viewers, it provides an advantage that the number of interesting programs increases. On the other hand, however, the zapping operation has a problem such that a complicated operation is necessary to find a desired program. In zapping using the up/down key, when the number of channels increases, the number of operations required for zapping increases. In zapping using the ten-key pad, although an operation similar to conventional one can be performed to select any of the channels assigned to the keys, in the case of zapping channels which are not assigned to the keys, a complicated operation has to be performed. Another method of finding a program is a method using an EPG (Electronic Program Guide). The EPG usually has a simple sorting function and is suitable for finding a program in some aspects. However, since the EPG is a method of retrieving mainly characters, for viewers who find a program by a conventional method of viewing mainly pictures, it cannot be always the that the method is easy to use.

In such circumstances, a zapping method with the up/down key, in which the user's preference is reflected, is proposed. According to the method, preference of a viewer is estimated from history information of programs viewed by the viewer, and is used for zapping. Specifically, Japanese Patent Application Laid-open (JP-A) No. 2000-253325 discloses a method of setting the order of selection to not the order of channels but the order of programs from the highest preference of the viewer. If the preference of the viewer is accurately reflected in the order, the viewer can relatively easily find a desired program by an operation similar to conventional one.

The method is effective since the viewer can relatively easily access a desired program by conventional zapping operation also in the environments of multiple channels. On the other hand, the conventional zapping method using mainly pictures still has some problems. One of the problems is that at the time of selecting a program again from a group of zapped programs, it is not easy to identify the program by viewing pictures. This happens because the viewer tries to find the program on the basis of the memory of the picture viewed last time. In the case of performing zapping in order from the highest preference of the viewer under the circumstance in which the number of programs is large, the viewer is not aware of the channel number or the title of the program so much. Consequently, it is expected that such a problem is becoming more conspicuous in future.

SUMMARY OF THE INVENTION

It is an object of the present invention to provide a novel program selecting method that is effective at solving the problems and capable of easily finding a desired program when a viewer sequentially views pictures of programs in order to select a program.

To achieve the object, the present invention provides a program selecting method including the steps of: storing still pictures or motion pictures of specific scenes of a plurality of viewed programs selected in a predetermined period; presenting the pictures of the specific scenes corresponding to a plurality of programs viewed in the past, during operation of program selection; and selecting the viewed program corresponding to the picture selected by operation of selecting the pictures presented.

More preferably, a list of a plurality of programs viewed in the past is presented simultaneously with the pictures of the specific scenes each of which corresponds to each of the viewed programs, during program selecting operation.

In the process of presenting the list of the plurality of programs viewed in the past simultaneously with the pictures of the specific scenes each of which corresponds to each of the viewed programs, during the program selecting operation, preferably, the pictures of the number corresponding to view time of the viewed programs are presented.

In the process of presenting the list of the plurality of programs viewed in the past simultaneously with the pictures of the specific scenes each of which corresponds to each of the viewed programs, during the program selecting operation, preferably, the list is presented on the screen on which the program being viewed at present is also displayed.

Preferably, the program selecting method according to the present invention further includes a step of switching a display state where the list of the plurality of programs viewed in the past is presented simultaneously with the pictures of the specific scenes each of which corresponds to each of the viewed programs to a state where the list and a program presently viewed are simultaneously displayed on the same screen, during program selecting operation.

In the process of presenting the list of the plurality of programs viewed in the past simultaneously with the pictures of the specific scenes each of which corresponds to each of the viewed programs, during the program selecting operation, preferably, cumulative elapsed time since start of the program selecting operation is presented on the screen on which the list is also presented.

In the process of presenting the list of the plurality of programs viewed in the past simultaneously with the pictures of the specific scenes each of which corresponds to each of the viewed programs, during the program selecting operation, preferably, a program being viewed before start of the program selecting operation is disposed in a selectable position.

Preferably, the program selecting method further includes a step of generating the list of the plurality of programs viewed in the past on the basis of preference of the user.

BRIEF DESCRIPTION OF THE DRAWINGS

FIG. 12 is a diagram showing the relation between the number of still picture frames 903 generated and time of viewing according to the second embodiment of the present invention.

DESCRIPTION OF THE PREFERRED EMBODIMENTS

Embodiments of the present invention will be described hereinbelow with reference to the drawings.

First Embodiment

Figure 1:
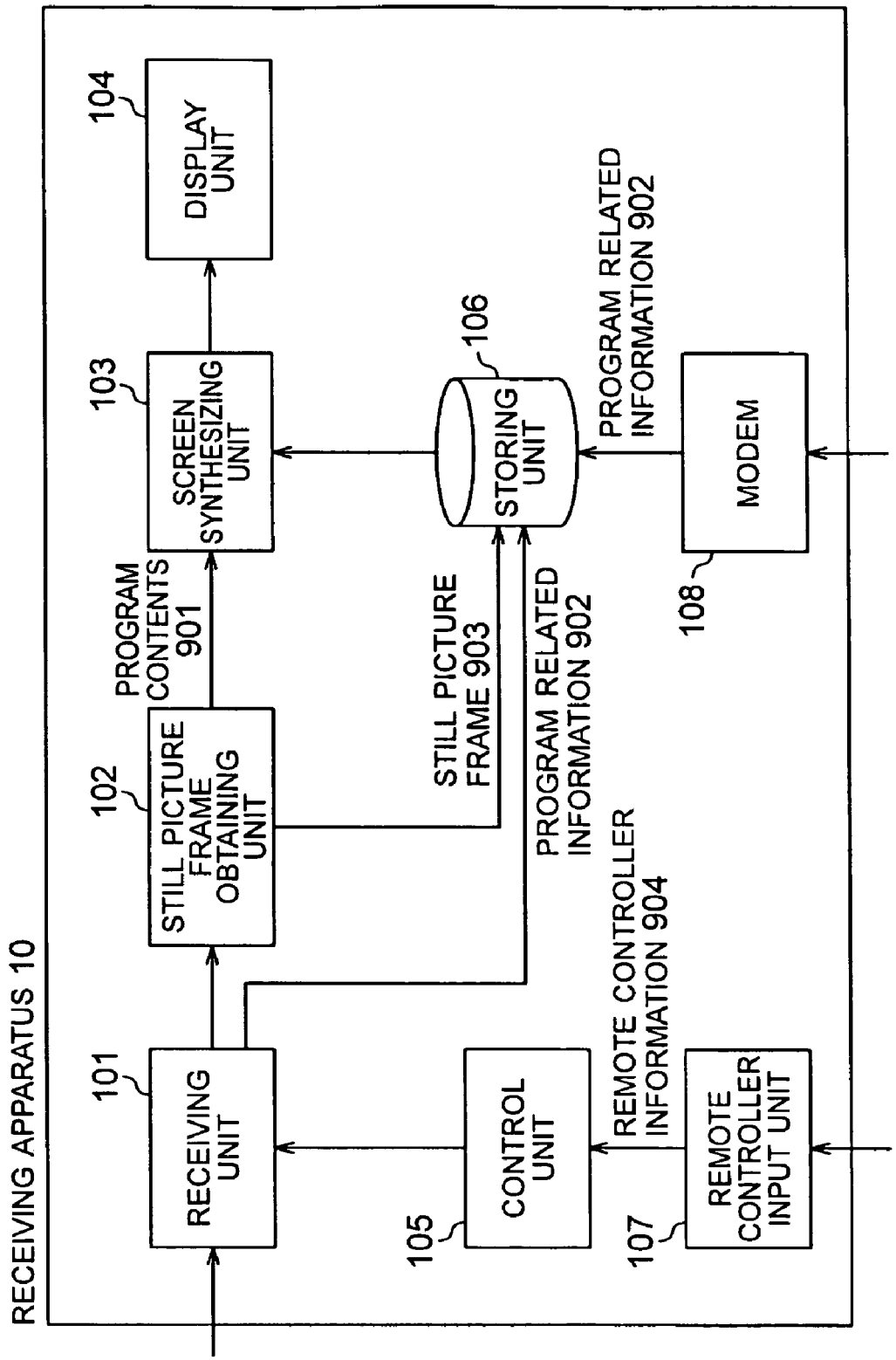
FIG. 1 is a block diagram showing the configuration of a receiving apparatus 10 according to first and second embodiments of the present invention.

FIG. 1 is a block diagram showing the configuration of a receiving apparatus 10 according to a first embodiment of the present invention.

The apparatus can receive digital or analog broadcast via a receiving unit 101. Broadcast data received by the receiving unit 101 is demodulated and separated and, after that, divided into an AV stream such as a picture, sound, and the like constructing a TV program (hereinbelow, called program contents 901) and information related to the program (hereinbelow, called program related information 902). After that, the program contents 901 is sent to a still picture frame obtaining unit 102. The program related information 902 is sent to a storing unit 106. The program related information 902 includes contents similar to the program information included in SI (Service Information) transmitted by being multiplexed on BS digital broadcast data. Normally, the program related information 902 of programs for about coming one week is stored in the storing unit 106.

The still picture frame obtaining unit 102 decodes the program contents 901 separated by the receiving unit 101 and transfers the decoded program contents 901 to a screen synthesizing unit 103. The still picture frame obtaining unit 102 also captures an arbitrary still picture frame 903 from the decoded program contents 901 and transfers it to the storing unit 106. Similarly, the still picture frame obtaining unit 102 transfers the sound information in the program contents 901 to a (not-shown) sound output unit. The screen synthesizing unit 103 synthesizes or switches the program contents 901 received via the still picture frame obtaining unit 102 from the receiving unit 101 and information such as a still picture, characters, a figure, or the like received from the storing unit 106. In the case of viewing a normal television program, the screen synthesizing unit 103 transfers motion picture information in the program contents 901 received from the still picture frame obtaining unit 102 to a display unit 104. On the other hand, in the case of displaying an EPG or information indicative of the contents of a program, the screen synthesizing unit 103 synthesizes a still picture or character and figure information including the program related information 902 obtained from the storing unit 106 onto the motion picture information and transfers the resultant to the display unit 104. The display unit 104 outputs the result of synthesis from the screen synthesizing unit 103 onto the screen and presents it to the viewer. Similarly, the sound output unit outputs the obtained sound information synchronously with a still picture. The display unit 104 for presenting a screen is not necessarily provided in the receiving apparatus 10 but may be provided on the outside.

The storing unit 106 stores the program related information 902 and also the still picture frame 903. The storing unit 106 can be constructed by a hard disk or a semiconductor memory. However, the storing unit 106 is not limited to them. The receiving apparatus 10 has a modem 108. The program related information 902 may exist in a specific site on the Internet. In this case, the receiving apparatus 10 is connected to the Internet via the modem 108 and can download the program related information 902. The program related information 902 obtained via the modem 108 is also stored in the storing unit 106 in a manner similar to the above.

Figure 2:
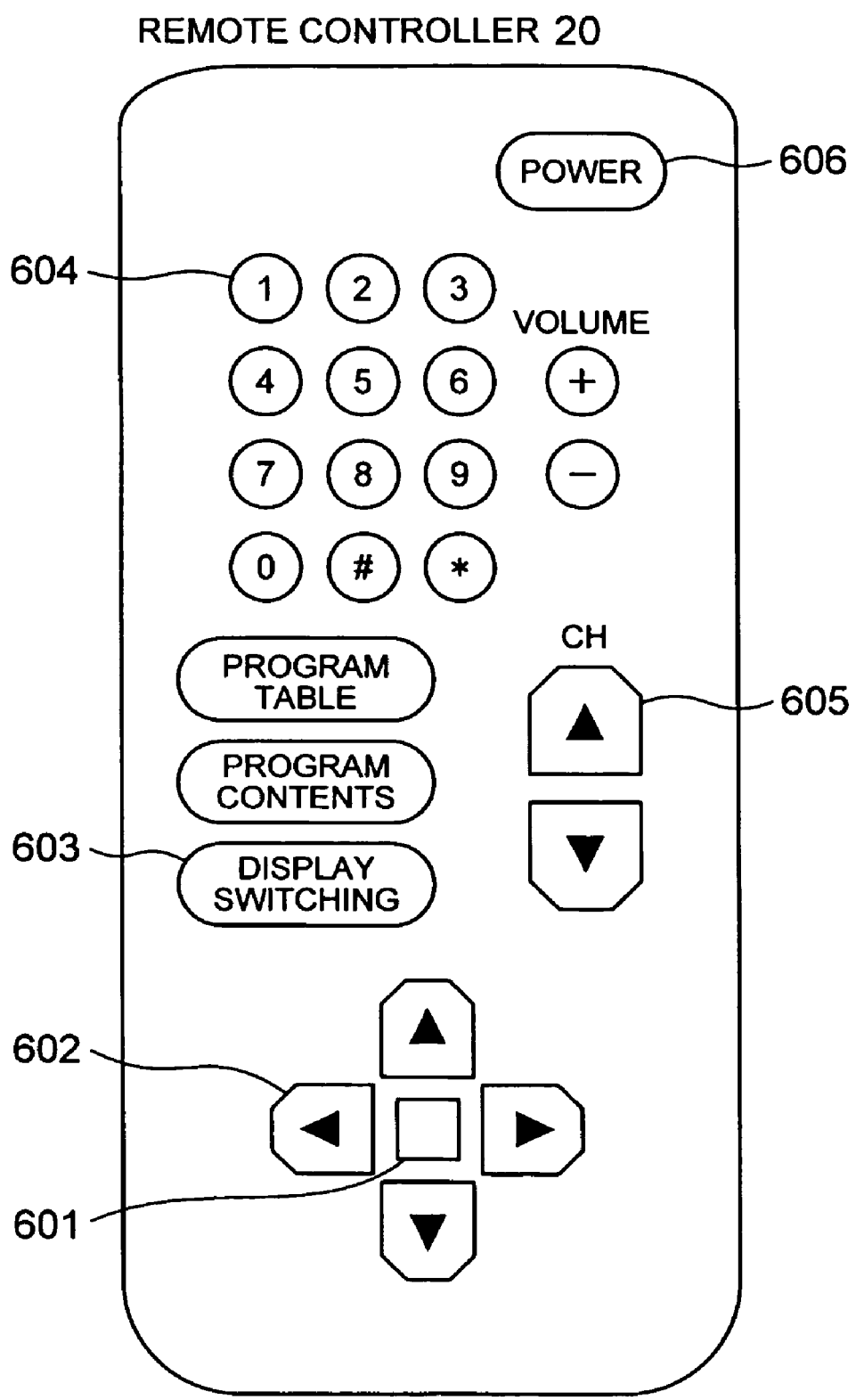
FIG. 2 is a configuration example of the keys on a remote controller 20 according to the first and second embodiments of the present invention.

The viewer uses a remote controller 20 as operating means at the time of viewing a program. FIG. 2 shows a configuration example of the keys on the remote controller 20. The remote controller 20 has, at least, normal up/down keys 605, a ten-key numerical pad 604, a power key 606, four-way (up, down, right, and left) keys 602, a determination key 601, and a display switching key 603 for switching display images. In addition to the above, a "program table" key for displaying an EPG and a "program contents" key for displaying the contents of a program may be provided. Remote controller information 904 generated by depression of a remote controller key of the viewer is received by a remote controller input unit 107 and is transferred to a control unit 105. The control unit 105 receives the remote controller information 904 and sends channel selection control information according to the received information to the receiving unit 101. The receiving unit 101 tunes to a channel designated by the channel selection control information. The control unit 105 also sends control information for extracting a still picture frame and storing the extracted still picture frame to the storing unit 106 to the still picture frame obtaining unit 102. The control information is properly sent in accordance with channel selection history of the viewer and view time of the same program. In the case where display switching information is received as the remote controller information 904 from the remote controller input unit 107, the control unit 105 sends control information for switching to a predetermined screen to the screen synthesizing unit 103 and controls the still picture frame obtaining unit 102, storing unit 106, modem 108, and the like.

Next, the program selecting process by the apparatus 10 will now be described.

Figure 3:
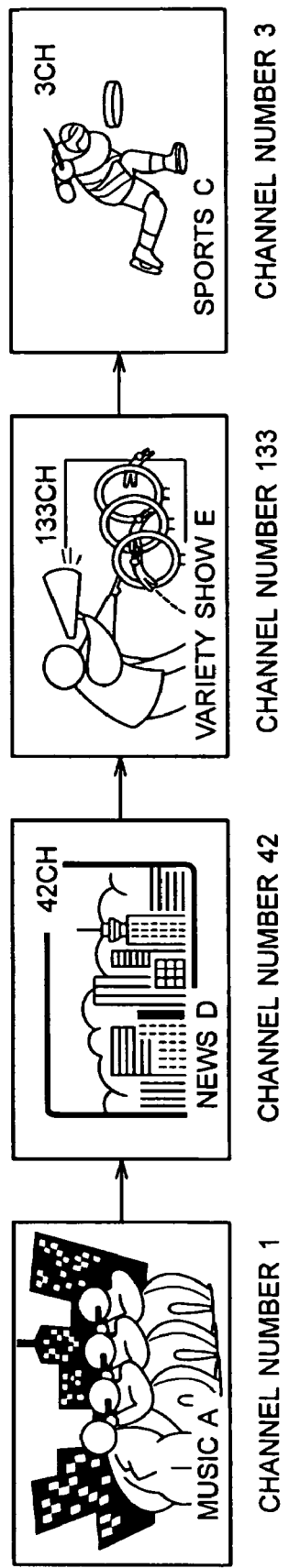
FIG. 3 is an example of presentation of shift of screens in order of channels when right and left keys 602 of the remote controller 20 are depressed.

FIG. 3 shows a state of screen transition in the case where zapping operation is performed. It is assumed here that the viewer watches a music program of channel number 1 first. Although it is assumed that the right and left keys 602 on the remote controller 20 are used to select a channel, the up/down keys 605 may be used instead. In the following, the case of using the right and left keys 602 will be described. As an example, channel selection is performed not in order of channels but on the basis of preference information of the viewer. Consequently, the channel numbers appearing at the time of zapping are at random. In FIG. 3, the viewer views the program of the channel number 1. After that, when the viewer presses the right key 602, the channel number shifts like 42, 133, and 3. The control unit 105 holds, as preference information, a channel selection list (not shown) in which programs are arranged in order from the highest preference.

The preference information of a viewer is manually set by the viewer or dynamically generated by the receiving apparatus 10. In the latter case, the receiving apparatus 10 has means for storing logs of operations on the remote controller and holding view history information of the viewer in order to generate preference information of the viewer. The receiving apparatus 10 also has means for generating preference information of programs of the viewer on the basis of the obtained view history information. Further, the receiving apparatus 10 has means for generating a channel selection list for performing zapping at specified time on the basis of the generated preference information of the viewer to enable zapping based on the preference information to be performed at specified time.

Figure 4:
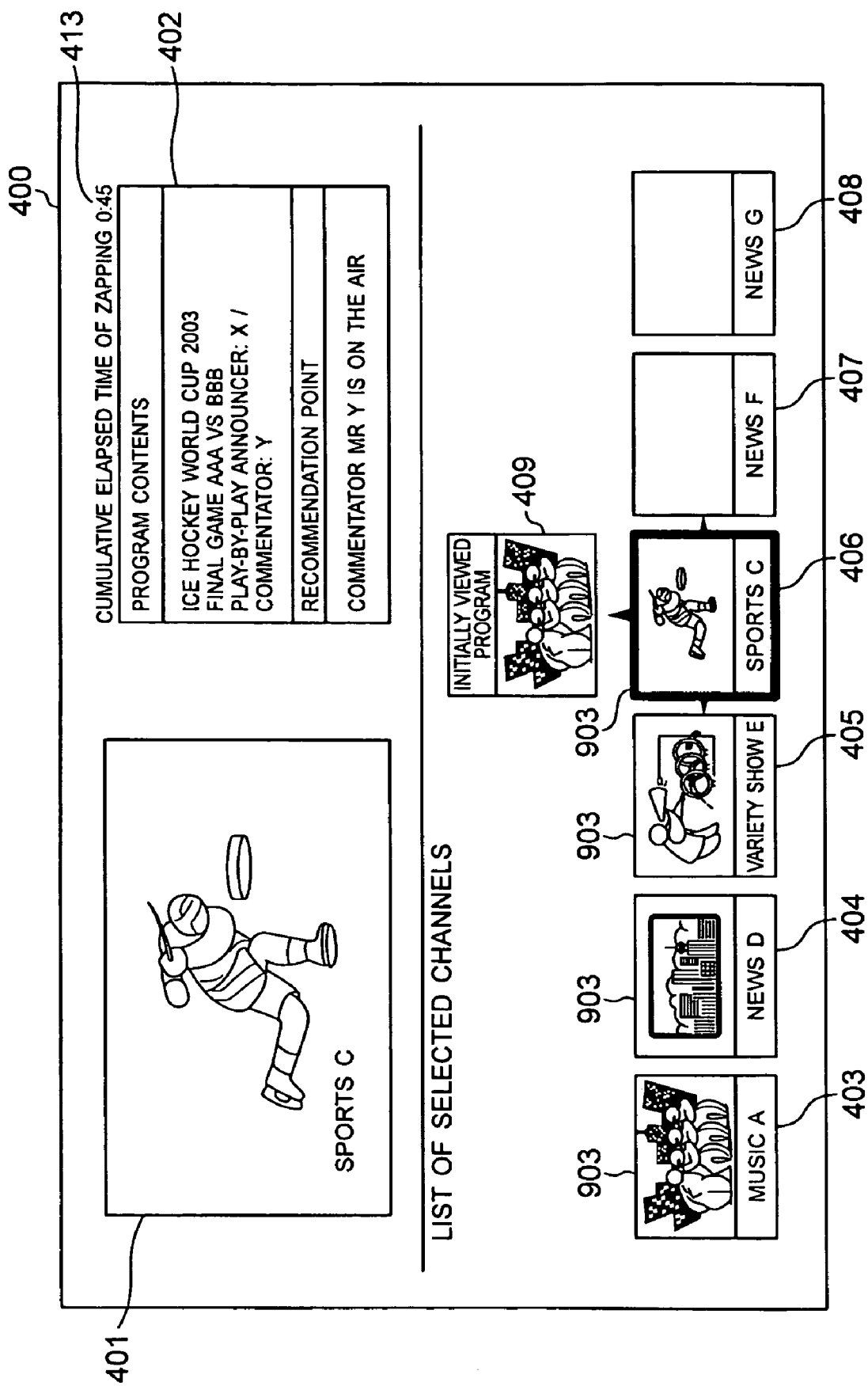
FIG. 4 is a screen presentation example according to the first embodiment of the present invention.
Figure 5:
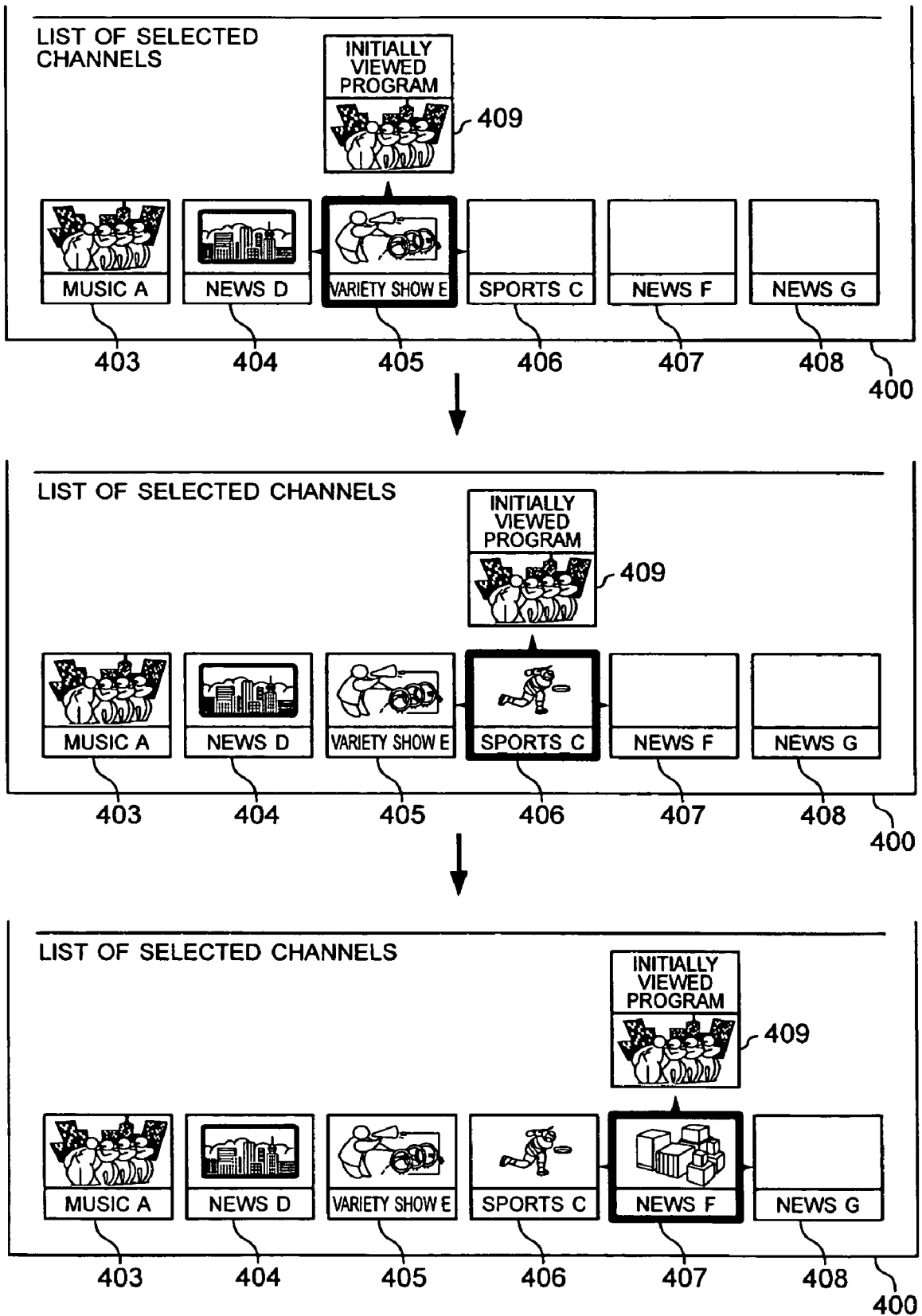
FIG. 5 is a screen presentation example according to the first embodiment of the present invention.

FIG. 4 shows a screen 400 for program selection (channel selection) displayed in the case where a program is selected by the zapping and, after that, a display switching key 603 of the remote controller 20 is depressed to switch display. In the screen, in addition to the program contents 901 (401 in FIG. 4) as a video stream being watched, description of the contents of the program (402 in FIG. 4) is displayed as necessary. The description of the contents of the program is generated on the basis of the program related information 902. If there is a function capable of displaying preference information of the viewer, the preference information may be also displayed together with the description of the contents of the program. Further, in FIG. 4, the still picture frame 903 showing a part of the program zapped is displayed simultaneously with the program title as necessary. The size (area) of each still picture frame 903 is sufficiently smaller than that of the screen 400. A plurality of still picture frames 903 are simultaneously displayed in the screen 400 and are selectable. A list of selected channels is displayed in such a manner that a still picture frame list and a program title list corresponding to the still picture frame list are associated with each other for each viewed program. In the present invention, the program title list can be omitted. In this case, a viewed program is selected on the basis of the still picture frames. Each still picture frame 903 is part of a program picture viewed by the viewer during zapping. Specifically, the viewer zapped, in order from a program title "music A" 403 initially viewed, "news D" 404, "variety show E" 405, and "sports C" 406. The still picture frames and the program titles can be selected by four-way keys 602 of the remote controller 20. For each selection, accordingly, focus is shifted and the program contents 901 (401 in FIG. 4) and the description of the contents of the program (402 in FIG. 4) are switched. For example, the still picture frame and the program title of the program title "sports C" 406 are focused here. When the left key 602 is depressed, the focus is shifted to the program title "variety show E" 405, and the program contents 901 and the description of the program contents are switched to the "variety show E" 405. There are parts in each of which the program title is displayed but the still picture frame 903 is not shown yet (407 and 408 in FIG. 4). Each of the parts indicates that the still picture frame 903 is not shown since the viewer has not selected the channel yet. In the embodiment, channel selection is performed according to the channel selection list, so that only a program title can be displayed on the screen before channel selection. Consequently, when the right key 602 is depressed, focus is shifted to the part of a program title "news F" 407, and the still picture frame 903 of the "news F" 407 is displayed in a predetermined location. As necessary, cumulative elapsed time (413 in FIG. 4) since start of zapping can be also displayed. The viewers often check the other programs between programs and during commercials. The cumulative elapsed time since start of the zapping is displayed so that the viewer can determine when to return to the initially watched program in such a case. A method of displaying the cumulative elapsed time will be described later. Similarly, in the above case, it is desirable that the viewer can easily return to the initially watched program from a program being presently selected. Therefore, in the example of presentation of FIG. 4, the title and the still picture frame 903 of the program initially watched (409 in FIG. 4) are always displayed above the focus. The viewer can always select the initially watched program by depressing the up key 602. FIG. 5 shows changes in the lower half of the screen of the screen presentation example shown in FIG. 4 and illustrates a state of screen shift of the initially watched screen 409 when the right key 602 is repeatedly depressed. As shown in FIG. 5, the initially watched screen 409 is displayed in a position which can be always selected by the up key.

The display screen in the state shown in FIG. 4 is switched by depressing the display switching key 603 again or depressing the determination key 601 in a state where focus is achieved on a program desired to be displayed on a full screen.

In the following, the program selecting process based on the preference information of the viewer shown in FIGS. 3 and 4 will be described with reference to FIGS. 6, 7, and 8.

Figure 6:
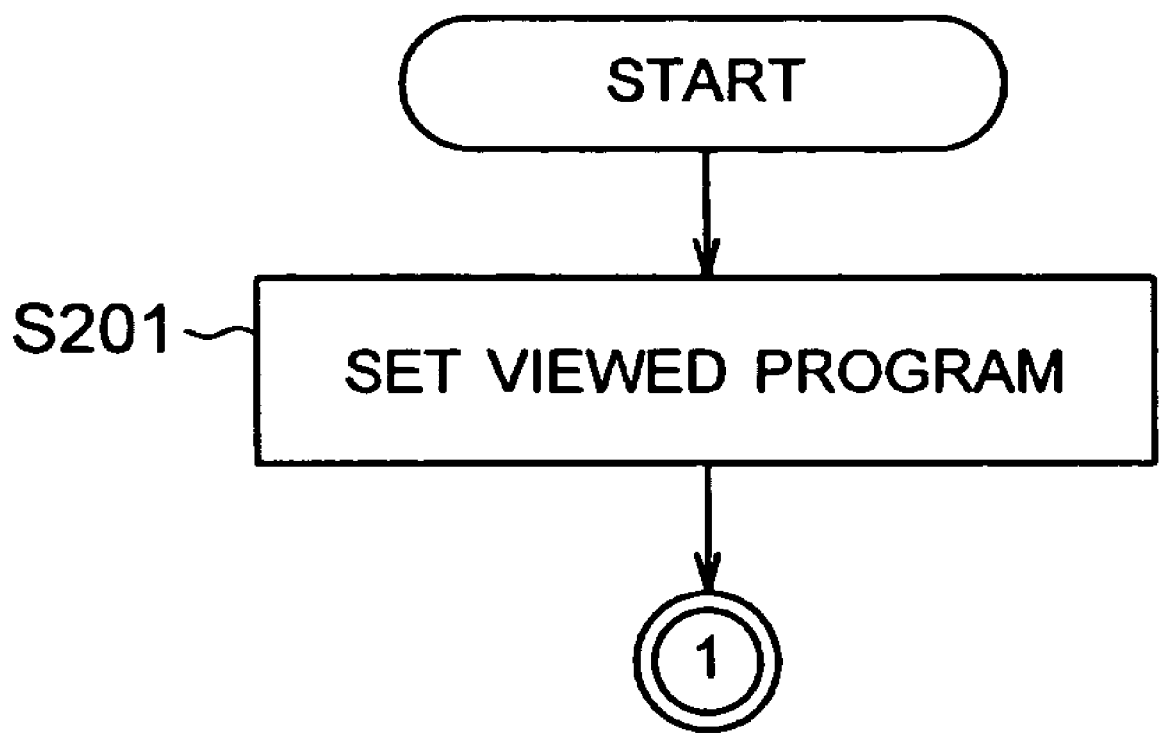
FIG. 6 is a flowchart of program selecting process according to the first and second embodiments of the present invention.

FIG. 6 is a processing flow from start of the receiving apparatus 10 until the first program is displayed. When the viewer starts the receiving apparatus 10, the control unit 105 tunes to a program to be presented first and sets the program as a viewed program (step S201 in FIG. 6). The viewed program is set as an "initial program" which is watched by the viewer before zapping. The program presented first may be a program viewed last time or may be a program of the highest order among programs written in the channel section list. After step S201, the receiving apparatus 10 waits for an input of the remote controller information 904 (step S202 in FIG. 7).

Figure 7:
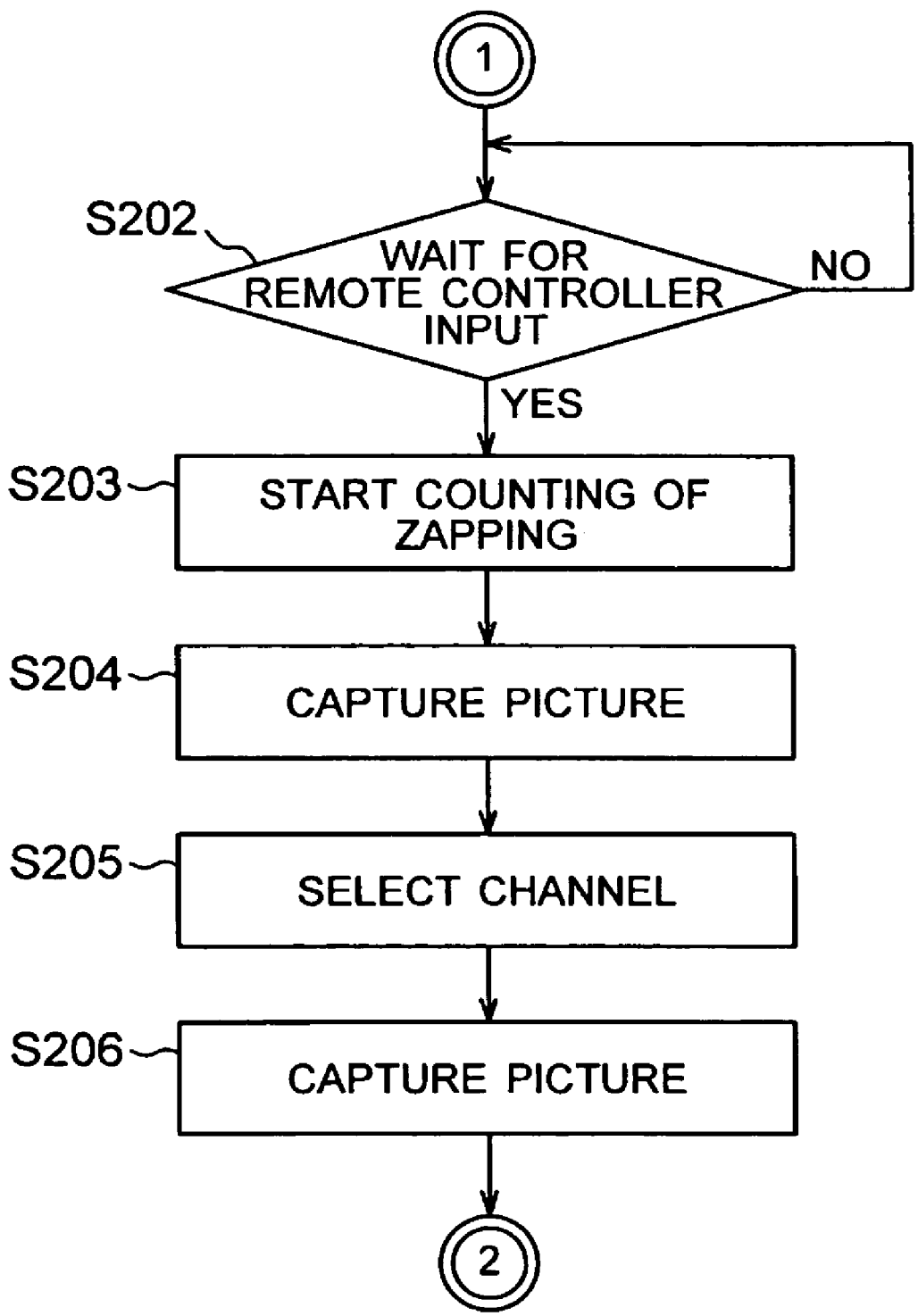
FIG. 7 is a flowchart of the program selecting process according to the first and second embodiments of the present invention.

FIG. 7 shows processes performed during a period from a state where the receiving apparatus 10 waits for a remote control information input before start of zapping until the zapping starts. In step S202, the receiving apparatus 10 waits for an input of the remote controller information 904. When the remote controller input unit 108 receives the remote controller information 904 and regards that the received information is channel selection information, the control unit 105 regards that zapping has started and starts counting cumulative elapsed time of the zapping (step S203 in FIG. 7). After that, the control unit 105 sends a request for obtaining one or more still picture frames of the program watched before channel selection, that is, the initially viewed program to the still picture frame obtaining unit 102. The still picture frame obtaining unit 102 captures one or more still picture frames of the designated program, stores it into the storing unit 106, and sends an end notification to the control unit 105 (step S204 in FIG. 7). The control unit 105 receives the end notification and sends a request for tuning to the designated program to the receiving unit 101. The receiving unit 101 receives the request and tunes to the designated program (step S205 in FIG. 7). After completion of the channel selection, the control unit 105 sends again a request for capturing one or more still picture frames of the program of the selected channel to the still picture frame obtaining unit 102. The still picture frame obtaining unit 102 captures one ore more still picture frames of the designated program, stores it into the storing unit 106, and sends an end notification to the control unit 105 (step S206 in FIG. 7).

Figure 8:
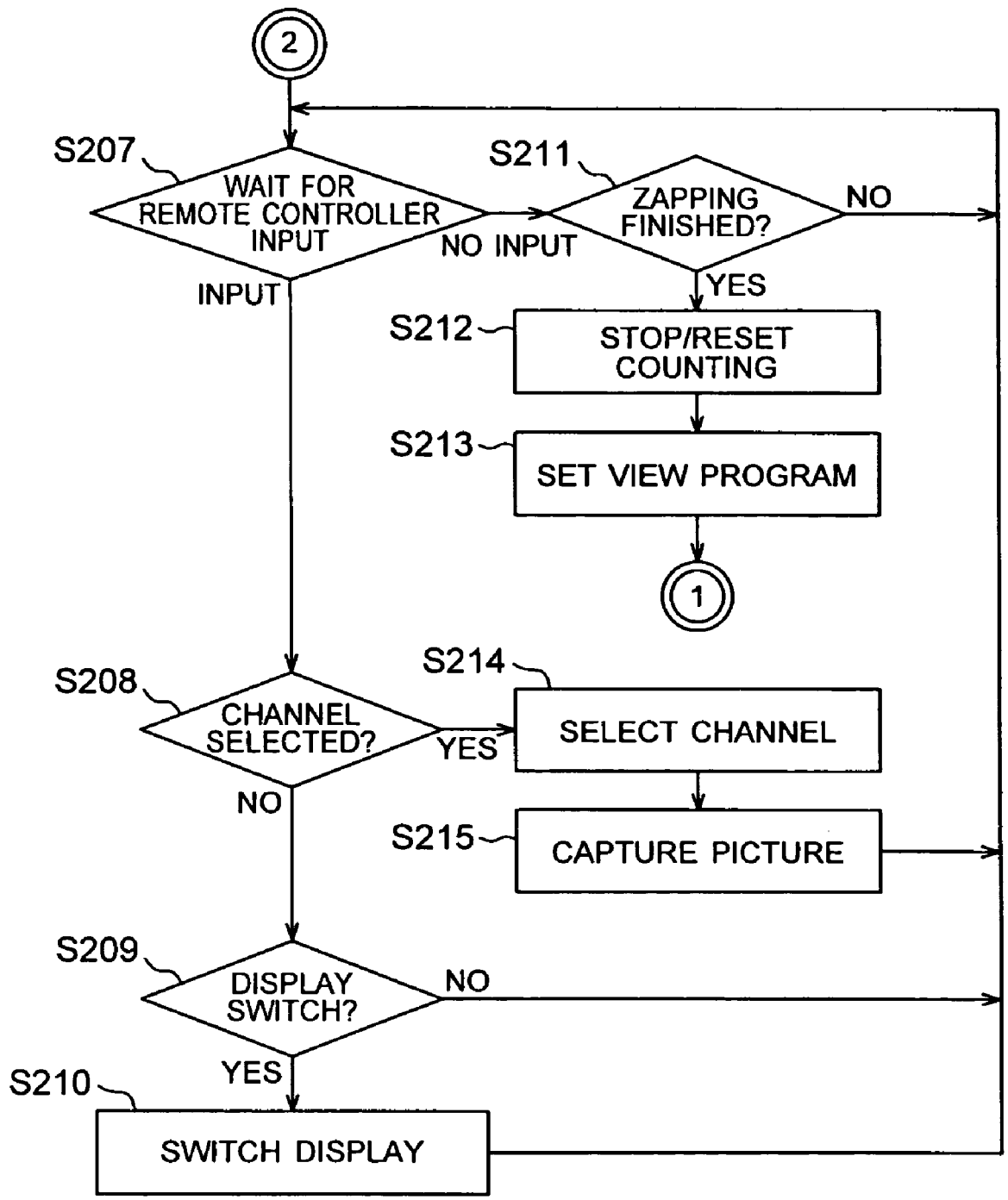
FIG. 8 is a flowchart of the program selecting process according to the first embodiment of the present invention.

When channel selection is performed even once in step S205, it is regarded that zapping has started and the following processes are performed according to the process flow during zapping shown in FIG. 8. In step S207, the control unit 105 waits again for a remote control input. When there is no input of the remote controller information 904, the control unit 105 determines whether it is regarded that the zapping is completed or not at predetermined time intervals (step S211 in FIG. 8). Usually, when there is no input of the remote controller information 904 for predetermined time or longer, it is regarded that the zapping is finished. When it is regarded that the zapping is finished, counting of cumulative elapsed time of the zapping is reset (step S212 in FIG. 8). The control unit 105 resets the program which is watched at that time as a viewed program (step S213 in FIG. 8), returns to step S202, and waits again for an input of the remote controller information 904. When the remote controller information 904 is input in step S207, whether the remote controller information 904 is channel selection information or not is determined (step S208 in FIG. 8). In the case where the remote controller information 904 is regarded as channel selection information, the control unit 105 sends channel selection control information based on the channel selection information to the receiving unit 101 to perform channel selection (step S214). The control unit 105 also sends a request for capturing one or more still picture frames of a program of the selected channel to the still picture frame obtaining unit 102. The still picture frame obtaining unit 102 captures one or more still picture frames of the designated program, stores it into the storing unit 106 and, after that, sends the end notification to the control unit 105 (step S215 in FIG. 8). After that, the control unit 105 returns to step S207 and waits for an input of the remote controller information 904. In the case where the remote controller information 904 is other than channel selection information in step S208, whether the information is information of display switching performed in response to depression of the display switching key 603 on the remote controller 20 or not is determined (step S209). In the case of the information of display switching, the control unit 105 sends a request for performing a predetermined synthesizing process to the screen synthesizing unit 103. The screen synthesizing unit 103 receives the request, obtains the program contents 901 from the receiving unit and, in addition, the still picture frame 903 and the program related information 902 which are stored in the storing unit 106, and generates a synthetic picture shown in FIG. 4 in accordance with predetermined process (step S210). Usually, as the still picture frame 903 used here, with respect to the viewed program, a still picture frame obtained by capturing a picture just before channel selection is used. With respect to the other programs, pictures captured just after channel selection are used. However, the present invention is not limited to this case. Also in the case of re-selecting a program selected once during zapping, the still picture frame 903 is updated. When information of display switching is already obtained during presentation shown in FIG. 4, in step S209, in a manner reversed to the above, the control unit 105 sends a request for displaying the program contents 901 which is presently broadcasted in a whole screen to the screen synthesizing unit 103.

Figure 9:
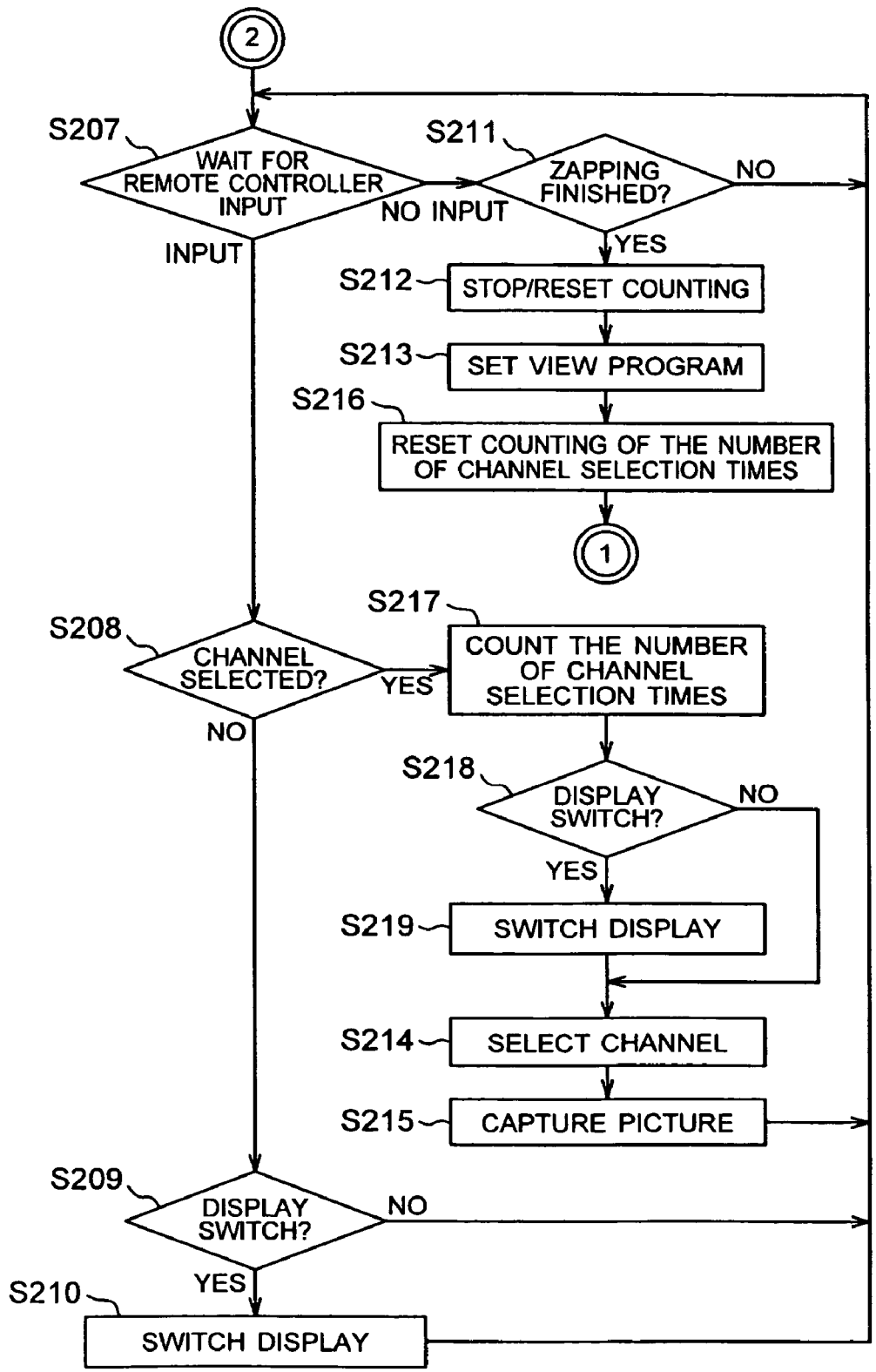
FIG. 9 is a flowchart of the program selecting process according to the first embodiment of the present invention.

Although the display switching of a screen is performed only when the display switching key of the remote controller 20 is depressed in the above description, display may be also automatically switched according to a timing of channel selection. For example, when the right and left keys 602 on the remote controller 20 are depressed a specific number of times, the screen may be automatically switched. FIG. 9 is a flowchart showing the case where display switch is automatically performed. FIG. 9 is a diagram obtained by newly adding a process for automatic switching (steps S216 to S219) to the process of FIG. 8. In the following, only the added part will be described. When the remote controller information 904 from the remote controller 20 is information related to channel selection in step S208, the control unit 105 increases the counting of the number of selection channels before the channel selection is performed (step S217). The counting is counting of the number of selecting channels since zapping has started. After that, the control unit 105 determines whether the counting has reached a predetermined number of times or not (step S218). When the counting reaches the predetermined number of times, the control unit 105 sends a request for performing a predetermined synthesizing process to the screen synthesizing unit 103. When the request is received, the screen synthesizing unit 103 obtains the program contents 901 from the receiving unit and, in addition, the still picture frame 903 and the program related information 902 which are stored in the storing unit 106, and generates a synthetic picture shown in FIG. 4 in accordance with a predetermined process (step S219). After that, in a manner similar to the process of FIG. 8, channel selection is performed in step S214. In the case where the counting has not reached the predetermined number of times in step S218, the process of step S219 is not performed but channel selection is carried out in step S214. In step S211, the control unit 105 determines whether zapping has been finished or not at predetermined time intervals. When it is regarded that zapping is finished, the control unit 105 resets the counting of the cumulative elapsed time (step S212), resets the program viewed at that time as a viewed program (step S213), and resets the counting of the number of channel selecting times in step S216.

According to the embodiment, in the TV program selecting method of the case where the viewer zaps, in particular, the viewer zaps in order from the highest preference of the viewer, history of the zapping is shown as a list including not only the program titles and channel numbers but also still picture frames. Consequently, the viewer does not have to remember the title of a program and the channel number of a program viewed during zapping. If the viewer remembers part of a picture viewed, the program can be identified. Moreover, a still picture frame and a program title in the list can be selected by using the remote controller. Consequently, for example, in a case such that a viewer zaps a number of programs and wishes to check one of the programs again, the program can be easily recognized and selected.

On the other hand, there is a case such that the viewer uses the zapping for checking other programs and returns to the initially viewed program. Also in such a case, it is shown on the screen that the initially viewed program can be easily selected, so that the viewer can immediately return to the initially viewed program. Further, since the cumulative elapsed time since the zapping has started is shown on the screen, the viewer can easily grasp when to return to the initially viewed program, for example, while checking the other programs.

In the embodiment, a still picture frame is used for recognizing a program of the viewer. The number of frames is not limited to one but a plurality of frames may be continuously captured and presented as a motion picture of a few seconds to few tens of seconds to the viewer. In this case, in FIG. 4, all of the still picture frames 903 of the program title "music A" 403, "news D" 404, "variety show E" 405, "sports C" 406, and "music A" 409 or only a focused part are/is presented as motion picture frames. As a processing flow, by sequentially capturing pictures after channel selection for predetermined time in step S215 in FIG. 8, a motion picture frame is obtained.

Second Embodiment

Figure 10:
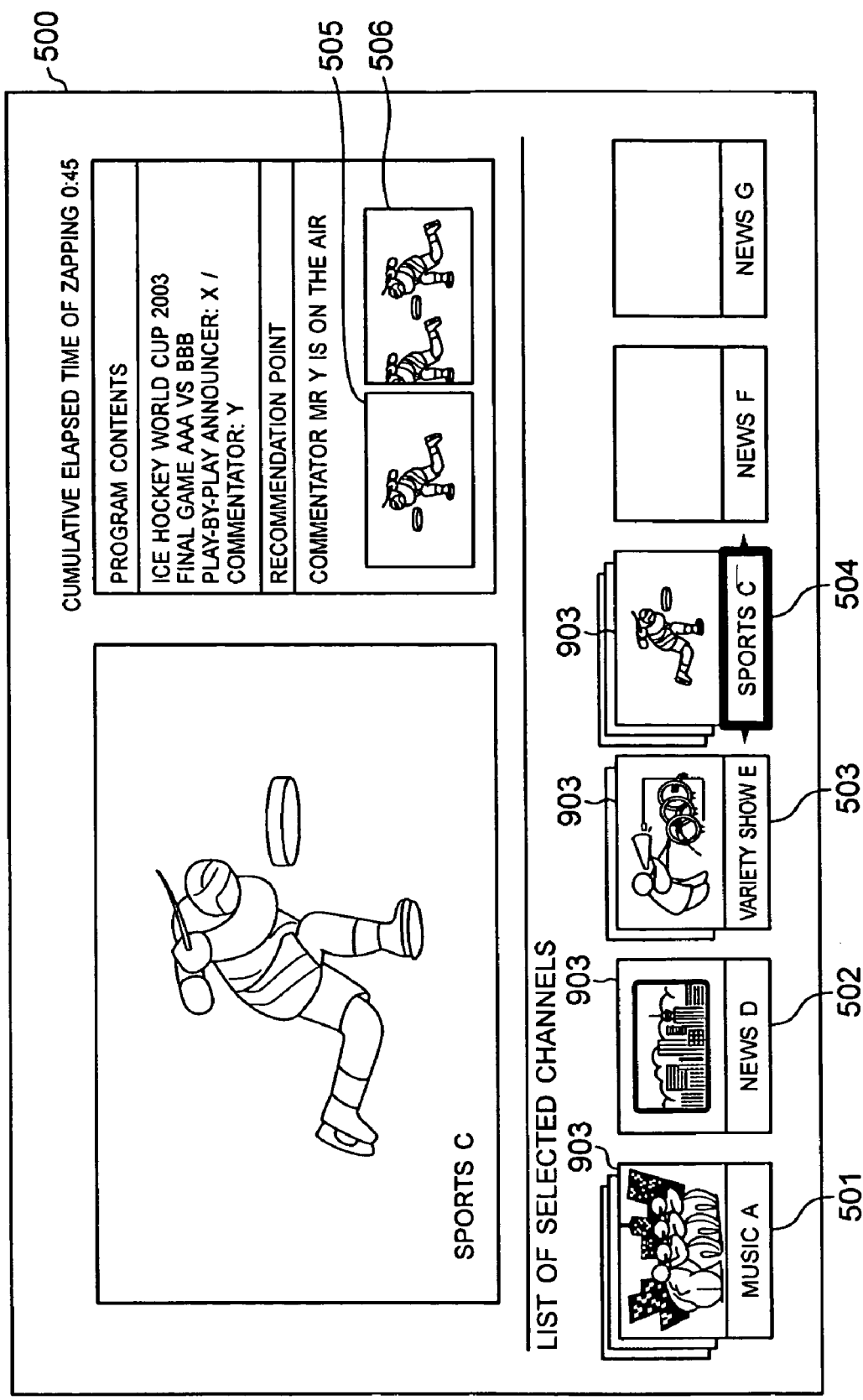
FIG. 10 is a screen presentation example according to the second embodiment of the present invention.

The configuration of the receiving apparatus 10 according to a second embodiment of the present invention is similar to that of the first embodiment. The configuration of the remote controller 20 is similar to that of the first embodiment. FIG. 10 shows a screen 500 for TV program selection in which a list of zapping history in the second embodiment is displayed. FIG. 10 shows an example of presentation when the viewer performs the zapping operation of FIG. 3 and then depresses the display switching key 603 of the remote controller 20. The presentation example of FIG. 10 is different from that of FIG. 4 of the first embodiment. In the second embodiment, in addition to the presentation of the first embodiment, the screen is presented so that length of time of viewing a program during zapping can be recognized. Further, a plurality of captured still picture frames 903 of the focused program are presented according to the length of viewed time. The occupation size (occupation area) of the still picture frame (or still picture frame group) 903 of each program is sufficiently smaller than the size of the screen 500. A plurality of still picture frames 903 are simultaneously displayed in the screen 500 and are selectable. In the example of presentation of FIG. 10, the length of time of viewing each program during the zapping can be identified on the basis of the number of still picture frames 903. In this case, it is understood that each of the number of the still picture frames 903 of a program title "music A" 501 and the number of the still picture frames 903 of the "sports C" 504 is three and the viewer viewed them for the longest time. The program of the next longest view time is of a program title "variety show E" 503 having two still picture frames 903. The program of the shortest view time is of a program title "news D" 502. With respect to the focused "sports C" 504, all of the captured still picture frames 903 are displayed on the screen. In this case, total three still picture frames 903 of the "sports C" 504 are captured. Consequently, the total three still picture frames 903 (504, 505, and 506 in FIG. 10) are displayed on the screen. The viewer recognizes a program from the displayed plural still picture frames 903. In FIG. 10, one or more still picture frames 903 showing part of each of zapped programs is/are displayed together with the program title. Specifically, a list of selected channels is displayed in such a manner that a list of still picture frames and a list of program titles corresponding to the list of still picture frames are associated with each other for each viewed program. In the present invention, the list of titles of viewed programs may be omitted. In this case, the viewer selects a viewed program on the basis of still picture frames.

Figure 11:
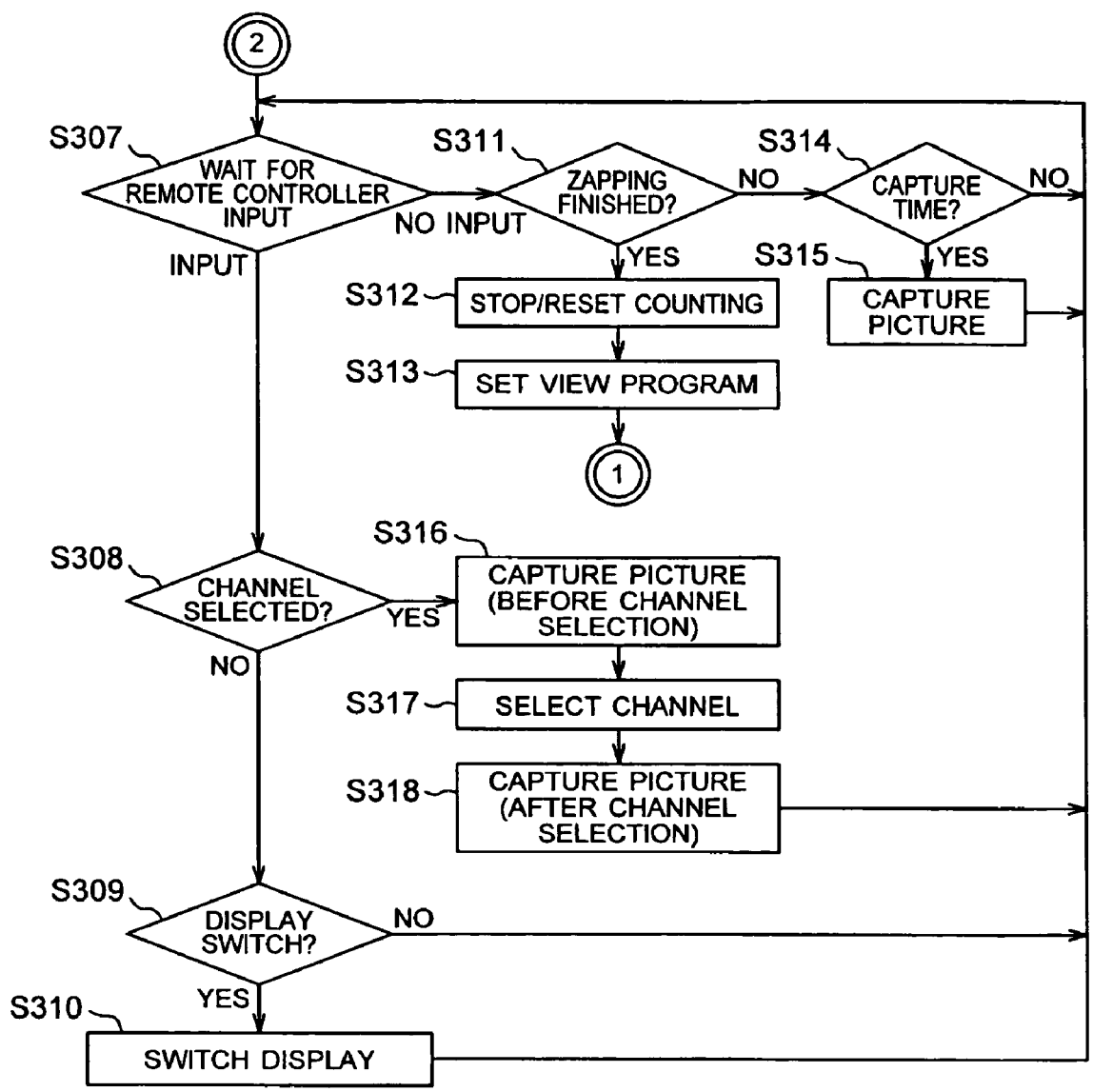
FIG. 11 is a flowchart of the program selecting process according to the second embodiment of the present invention.

FIGS. 6, 7, and 11 are processing flows of program selection based on preference information of the viewer shown in FIGS. 3 and 10. FIG. 6 shows a processing flow of start of the receiving apparatus 10 and presentation of the first program before the control unit 105 waits for an input from the remote controller. FIG. 7 is a processing flow starting from a state in which the control unit 105 waits for an input from the remote controller before zapping starts until zapping starts. FIG. 11 is a processing flow of the zapping. Since the processes shown in FIGS. 6 and 7 are similar to those of the first embodiment, their description will not be repeated. In the second embodiment, step S201 in FIG. 6 will be expressed as step S301. Steps S202 to S206 in FIG. 7 will be expressed as steps S302 to S306, respectively. In the following, the process during zapping will be described with reference to FIG. 11.

It is regarded that zapping starts and predetermined processes are performed in FIG. 7. After that, in step S307 of FIG. 11, the control unit 105 waits for an input of the remote controller information 904. When there is no input of the remote controller information 904, the control unit 105 determines whether zapping has finished or not at predetermined time intervals (step S311 in FIG. 11). Usually, if there is no input of the remote controller information 904 for predetermined time or longer, it is regarded that the zapping is finished. When it is regarded that the zapping is finished, counting of the cumulative elapsed time of zapping is reset (step S312 in FIG. 11). Further, the control unit 105 resets the program viewed at that time as a viewed program (step S313 in FIG. 11), returns to step S302 in FIG. 7 and waits again for an input of the remote controller information 904. In step S311, after a work of recognizing end of the zapping, the control unit 105 determines whether the still picture frame 903 is newly generated or not (step S314).

In the embodiment, a plurality of still picture frames 903 of the TV program are generated according to the length of time of viewing a program in the zapping. FIG. 12 shows the relation between the number of still picture frames 903 generated and view time per program in the zapping. The diagram shows the number of still picture frames 903 generated with respect to timings of selecting a program after selection of a certain program. The timing of selecting a program is limited to, at the longest, a period until zapping is automatically finished. One still picture frame 903 is always generated immediately after selection of a program. After that, until predetermined time elapses (up to time A in FIG. 12), another still picture frame 903 is not generated. That is, when another program is selected before the time A, the number of still picture frame 903 is only one. It is assumed that the time A is relatively short time of a few seconds or a few tens of seconds. In the case where the viewer performs zapping at short time intervals, the still picture frames 903 each of which is for each program are sequentially generated. After that, in the case where another program is selected during a period between the time A and time B, the second still picture frame 903 is generated. The second still picture frame 903 is generated on the basis of a picture captured immediately before another program is selected. At the time B, on the basis of a picture at that time point, the second still picture frame 903 is automatically generated on the basis of the picture at the time B. After that, in the case another program is selected between the time B until end of zapping, the third still picture frame 903 is generated. The third still picture frame 903 is generated on the basis of the picture just before selection of another program. Although the three still picture frames 903 are generated at the maximum here, the number of still picture frames generated is not limited to three. More than three still picture frames 903 may be generated. In this case, time C, time D, and the like as indications for generating the still picture frame 903 have to be set between the time B and the zapping end time.

From the above, in step S314, in the case where the number of generated still picture frames is one, whether view time reaches the time B or not is checked. If "YES", the control unit 105 sends a request for capturing one still picture frame of a selected program to the still picture frame obtaining unit 102. The still picture frame obtaining unit 102 captures a still picture frame of the designated program, stores it into the storing unit 106, and sends an end notification to the control unit 105 (step S315 in FIG. 11). After that, the control unit 105 returns to step S307 and waits for an input of the remote controller information 904.

In the case where the remote controller information 904 is input in step S307, whether the remote controller information 904 is channel selection information or not is determined (step S308 in FIG. 11). When it is regarded as channel selection information, the control unit 105 sends a request for capturing one still picture frame of a program before channel selection to the still picture frame obtaining unit 102. The still picture frame obtaining unit 102 captures the still picture frame 903 of the designated program, stores it into the storing unit 106, and sends an end notification to the control unit 105 (step S316 in FIG. 11). However, even in the case where it is regarded that the remote controller information 904 is channel selection information in step S308, if the view time has not reach the time A, the process of step S316 is skipped and the still picture frame 903 of the program before channel selection is not captured. After that, the control unit 105 sends channel selection control information based on the channel selection information to the receiving unit 101 and performs channel selection (step S317). Further, the control unit 105 sends again a request for capturing one or more still picture frames of a program of the selected channel to the still picture frame obtaining unit 102. The still picture frame obtaining unit 102 captures one still picture frame of the designated program, stores it into the storing unit 106, and sends the end notification to the control unit 105 (step S318 in FIG. 11). After that, the control unit 105 returns to step S307 and waits for an input of the remote controller information 904. If the remote controller information 904 is information other than channel selection information in step S308, the control unit 105 determines whether the information is information of display switching or not (step S309). In the case of display switching, the control unit 105 sends a request for performing a predetermined synthesizing process to the screen synthesizing unit 103. When the request is received, the screen synthesizing unit 103 obtains the program contents 901 from the receiving unit and, in addition, the still picture frame 903 and the program related information 902 which are stored in the storing unit 106, and generates a synthetic screen shown in FIG. 10 in accordance with a predetermined process (step S310).

Although it is expected that a plurality of still picture frames 903 exist for each program, what is displayed in a list which can be focused is the still picture frame 903 generated immediately after channel selection. Only for the viewed program, the still picture frame 903 captured just before channel selection is used. The other still picture frames are displayed only when focused.

Also in the case where a program selected once during zapping is selected again, the still picture frame 903 is updated. When information of display switching is obtained in the case where the screen shown in FIG. 10 is presented in step S309, in contrast to the above, the control unit 105 sends a request for displaying the whole screen of the program contents 901 which is being presently broadcasted to the screen synthesizing unit 103.

According to the embodiment, in the channel selection displaying method in which a viewer performs zapping, particularly, performs zapping in order from the highest preference of the viewer, effects similar to those of the first embodiment can be obtained. Moreover, in the second embodiment, the screen is presented so that length of time of viewing each program during zapping can be recognized. Further, a plurality of captured still picture frames 903 of the focused program are presented according to the length of view time. With the arrangements, for example, when viewing of each program becomes long during zapping, memory of detailed scenes of the program of the viewer become vague. There is consequently a case such that the viewer cannot identify a desired program only from a single still picture frame 903. In such a case as well, a program can be identified easily. Similarly, in the case such that a picture which is not related to the contents of a program such as a commercial is displayed as the still picture frame 903, things similar to the above happen. Also in such circumstances, the contents of a program can be identified from another still picture frame 903.

Although the still picture frame 903 is used for recognizing a program of the viewer in the second embodiment in a manner similar to the first embodiment, the number of frames is not limited to one. It is also possible to sequentially capture a plurality of frames and present them as a motion picture of a few seconds to a few tens of seconds. In this case, all of the still picture frames 903 of the program title "music A" 501, "news D" 502, "variety show E" 503, and "sports C" 504 or only a focused part are/is presented as a motion picture frame. As the processing flow, by successively capturing pictures after channel selection for predetermined time in step S318 in FIG. 11, a motion picture frame is captured.

In the presentation example of FIG. 10, a path for returning to the initially viewed program, which has been mentioned in the first embodiment, is not shown. However, a path similar to that of the first embodiment may be prepared also in the second embodiment. To be specific, also in FIG. 10, in a manner similar to FIG. 4, the program title and the still picture frame 903 (409 in FIG. 4) of the program initially viewed are always displayed above a focused frame, and the viewer can always select the initially viewed program by depressing the up key 602.

Although the screen display switching is performed only when the display switching key of the remote controller 20 is depressed in the second embodiment, alternately, the screen may be automatically switched according to timings of channel selection in a manner similar to the first embodiment.

This application claims priority from Japanese Patent Application No. 2003-392150 filed on Nov. 21, 2003, which is hereby incorporated by reference herein.

What is claimed is:

1. A program selecting method executed by a program selecting control apparatus, the method comprising:

an obtaining step of obtaining program related information related to a plurality of viewable broadcast programs through a broadcasting signal, the program related information containing program title information;

a first tuning and displaying step of tuning to a channel of a broadcast program to receive video data of the broadcast program, and displaying the received video data of the broadcast program on an entire screen;

a determining step of determining whether a viewer carries out a zapping operation or not, the zapping operation being a channel-selecting operation for the viewer to switch viewing broadcast programs at time intervals shorter than a predetermined period;

a first storing step of obtaining a still picture from the received video data of the broadcast program which had been viewed before a start of the zapping operation and storing the still picture;

a second storing step of obtaining a plurality of still pictures after the start of the zapping operation from video data of broadcast programs respectively viewed through the zapping operation, and storing the plurality of still pictures, wherein a number of still pictures of each broadcast program viewed through the zapping operation is obtained based on a view time of each respective broadcast program viewed through the zapping operation;

an arranging and displaying step of, in case that the zapping operation is repeated a predetermined number of times, (1) displaying the plurality of still pictures and program titles corresponding to the broadcast programs viewed through the zapping operation so that the broadcast programs are arranged in a row in the order of viewing in the zapping operation on a first partial area of the screen, (2) displaying video data of a broadcast program being viewed on a second partial area of the screen, and (3) displaying the still picture corresponding to the broadcast program which had been viewed before the start of the zapping operation, on a third partial area of the screen, wherein the number of still pictures obtained for each respective broadcast program viewed through the zapping operation is displayed so that the number of still pictures are stacked upon each other; and a second tuning and displaying step of, when one still picture is selected from among the plurality of still pictures displayed by the arranging and displaying step, tuning to a channel of a broadcast program corresponding to the selected still picture to receive video data of the broadcast program corresponding to the selected still picture, and displaying the received video data of the broadcast program corresponding to the selected still picture on the screen.

2. A program selecting method according to claim 1, further comprising, when one of the still pictures is selected by the viewer from among the plurality of still pictures displayed by the second tuning and displaying step, tuning to a channel of the broadcast program which corresponds to the selected still picture to receive video data of the broadcast program corresponding to the selected still picture, and displaying the received video data of the broadcast program corresponding to the selected still picture.

3. A program selecting method according to claim 1, wherein, the arranging and displaying step displays the plurality of still pictures and the program titles corresponding to the broadcast programs viewed through the zapping operation so that the broadcast programs are arranged in a row horizontally on the screen, and displays the still picture corresponding to the broadcast program which had been viewed before the start of the zapping operation at a position adjacent to an upper side of the selected still picture corresponding to the broadcast program being viewed, and wherein the plurality of still pictures corresponding to the broadcast programs viewed through the zapping operation are selectable in series by the viewer's operation of left and right keys of a remote controller, and the still picture corresponding to the broadcast program which had been viewed before the start of the zapping operation is selectable by the viewer's operation of an up key of the remote controller.

4. A program selecting method according to claim 1, wherein the arranging and displaying step displays a plurality of program titles of broadcast programs which are not viewed through the zapping operation in addition to the plurality of still pictures and the program titles corresponding to the broadcast programs viewed through the zapping operation in descending order of the viewer's preference, wherein each of the plurality of program titles of each of the broadcast programs which is not viewed through the zapping operation is displayed without a still image.

5. A program selecting control apparatus comprising:

an obtaining unit that obtains program related information related to a plurality of viewable broadcast programs through a broadcasting signal, the program related information containing program title information;

a first tuning and displaying unit that tunes to a channel of a broadcast program to receive video data of the broadcast program, and displays the received video data of the broadcast program on an entire screen;

a determining unit that determines whether a viewer carries out a zapping operation or not, the zapping operation being a channel-selecting operation for the viewer to switch viewing broadcast programs at time intervals shorter than a predetermined period;

a first storing unit that obtains a still picture from the received video data of the broadcast program which had been viewed before a start of the zapping operation and stores the still picture;

a second storing unit that obtains a plurality of still pictures after the start of the zapping operation from video data of broadcast programs respectively viewed through the zapping operation, and stores the plurality of still pictures, wherein the second storing unit obtains a number of still pictures of each broadcast program viewed through the zapping operation based on a view time of each respective broadcast program viewed through the zapping operation;

an arranging and displaying unit that, in case that the zapping operation is repeated a predetermined number of times, (1) displays the plurality of still pictures and program titles corresponding to the broadcast programs viewed through the zapping operation so that the broadcast programs are arranged in a row in the order of viewing in the zapping operation on a first partial area of the screen, (2) displays video data of a broadcast program being viewed on a second partial area of the screen, and (3) displays the still picture corresponding to the broadcast program which had been viewed before the start of the zapping operation, on a third partial area of the screen, wherein the arranging and displaying unit displays the number of still pictures obtained for each respective broadcast program viewed through the zapping operation so that the number of still pictures are stacked upon each other; and a second tuning and displaying unit that, when one still picture is selected from among the plurality of still pictures displayed by the arranging and displaying unit, tuning to a channel of a broadcast program corresponding to the selected still picture to receive video data of the broadcast program corresponding to the selected still picture, and displays the received video data of the broadcast program corresponding to the selected still picture on the screen.

6. A program selecting control apparatus according to claim 5, further comprising, when one of the still pictures is selected by the viewer from among the plurality of still pictures displayed by the second tuning and displaying unit, a unit that tunes to a channel of the broadcast program which corresponds to the selected still picture to receive video data of the broadcast program corresponding to the selected still picture, and displays the received video data of the broadcast program corresponding to the selected still picture on the screen.

7. A program selecting control apparatus according to claim 5, wherein, the arranging and displaying unit displays the plurality of still pictures and the program titles corresponding to the broadcast programs viewed through the zapping operation so that the broadcast programs are arranged in a row horizontally on the screen, and displays the still picture corresponding to the broadcast program which had been viewed before the start of the zapping operation at a position adjacent to an upper side of the selected still picture corresponding to the broadcast program being viewed, and wherein the plurality of still pictures corresponding to the broadcast programs viewed through the zapping operation after operation are selectable in series by the viewer's operation of left and right keys of a remote controller, and the still picture corresponding to the broadcast program which had been viewed before the start of the zapping operation is selectable by the viewer's operation of an up key of the remote controller.

8. A program selecting control apparatus according to claim 5, wherein the arranging and displaying unit displays a plurality of program title of broadcast programs which are not viewed through the zapping operation arranged in descending order of the viewer's preference in addition to the plurality of still pictures and the program titles corresponding to the broadcast programs viewed through the zapping operation, wherein each of the plurality of program titles of each of the broadcast programs which is not viewed through the zapping operation is displayed without a still image.

* * * * *